Feb. 6, 1968 K. E. BUCKMAN ET AL 3,367,508
LIQUID FILTER UNITS
Filed July 12, 1965
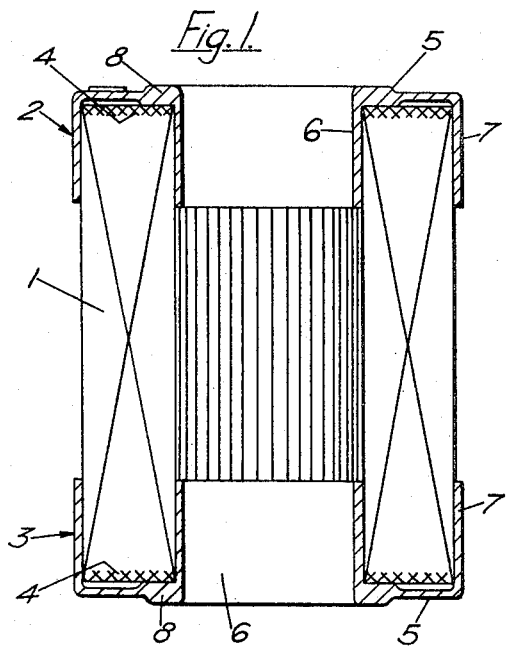
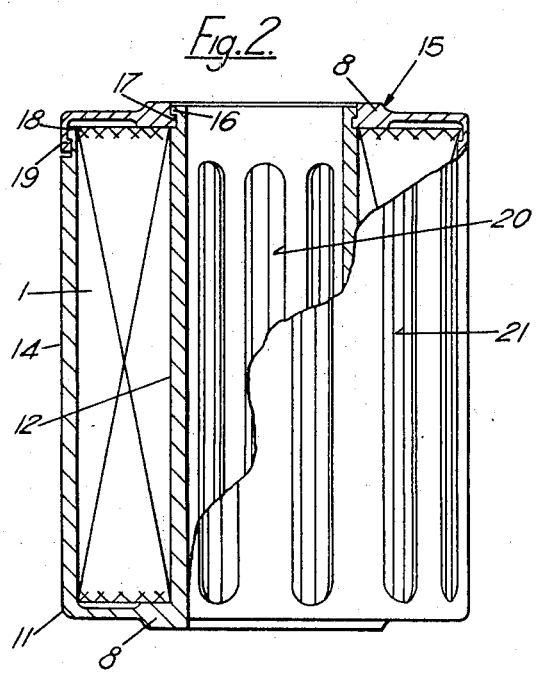
Inventors
Kenneth Ernest Buckman
& Ronald Arthur Cross
BY G. E. Johnson
Attorney

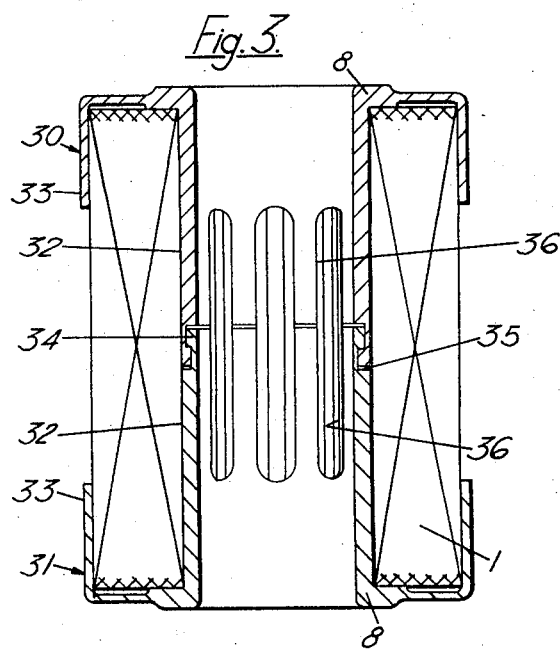
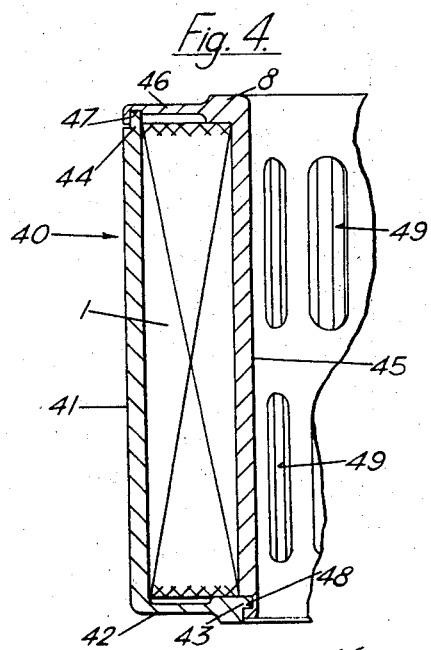

United States Patent Office 3,367,508
Patented Feb. 6, 1968

3,367,508
LIQUID FILTER UNITS
Kenneth Ernest Buckman, Winsor, near Woodlands, and Ronald Arthur Cross, Maybush, England, assignors to General Motors Corporation, Detroit, Mich., a corporation of Delaware
Filed July 12, 1965, Ser. No. 471,036
3 Claims. (Cl. 210—457)

ABSTRACT OF THE DISCLOSURE

A liquid filter for installation in a casing, the filter including two plastic end plates joined to coaxial inner and outer perforated walls by means of plural interengaged annular bead and groove formations to enclose an annular porous filter element.

---

This invention relates to liquid filter units and in particular to oil filter units such as are used in the lubrication systems of internal combustion engines.

Such filter units commonly comprise an annular filter element, a perforate centre support tube fitting within the element and end plates secured to each end of the element and to the centre tube; the unit may also have an outer perforate support tube which may also be secured to the end plates.

In a filter unit according to the invention a support member for an annular filter element comprises a member, preferably a unitary moulding, of synthetic rubber or like plastics material formed as an annular flat-bottomed trough, the base of the trough being adapted to engage an end of the element and the co-axial inner and outer walls of the trough respectively engaging inner and outer peripheral portions of the element.

There may be two such support members fitted one to each end of the element; or one such support member may have inner and outer walls which extends to the other end of the element, the free ends of the walls being secured to an annular end cap at said other end, for example by means of interengaged annular bead and groove formations on the wall end and the inner and outer peripheries of the end cap.

Alternatively the inner annular wall of each of a pair of the support members may be interengaged with each other by such bead and groove formations, at a position intermediate the ends of the element, the outer wall of each support member being shorter than the inner wall. The inner or the outer walls, or both walls of the support members may be perforated or slotted.

In another embodiment of the invention one support member comprises an annular end plate integral with a centre tube and the other support member comprises an annular end plate with an integral outer support tube, the end of the centre tube of one support member being interengaged with the inner peripheral portion of the other support member, the end of the outer support tube of which is engaged with the outer peripheral portion of the end plate of the said one support member.

An integral annular gasket may be formed on the inner and on the outer face of the base portion of each support member.

The support members may be a press-fit within, and around, the filter element. Alternatively or additionally the support members may be secured to the element with an adhesive.

Support members in accordance with the invention are particularly suitable for use with filter elements formed from a strip of synthetic resin impregnated filter paper which is joined at its ends and is folded about a regularly spaced series of transverse fold lines to form a series of pleats in which the fold lines extend longitudinally of the annulus, the ends of each pleat being individually sealed, separate from adjacent pleats, by means of adhesive applied to the opposed faces of the two parts of the ends of each pleat.

The scope of the invention is defined by the appended claims; and the invention and the method by which it is to be performed are hereinafter particularly described with reference to the accompanying drawings in which:

FIGURE 1 is a vertical section through a first embodiment of a filter unit according to the invention;

FIGURE 2 is a part sectional elevation of a second embodiment of a filter unit according to the invention;

FIGURE 3 is a vertical section through a third embodiment of a filter unit according to the invention; and FIGURE 4 is a vertical section through part of a fourth embodiment of a filter unit according to the invention.

The filter unit shown in FIGURE 1 comprises an annular pleated paper filter element 1 and a pair of support members 2, 3 fitted respectively to opposite ends of the element 1. The filter element 1 is formed from a strip of synthetic resin-impregnated filter paper which is joined at its ends and is folded about a regularly spaced series of transverse fold lines to form a series of pleats in which the fold lines extend longitudinally of the annulus, the ends of each pleat being individually sealed, separate from adjacent pleats, by means of adhesive 4 applied to the opposed faces of the two parts of the ends of each pleat.

The support members 2, 3 are of similar construction, each being formed as a unitary moulding of synthetic rubber or like plastic material formed as an annular flat-bottomed trough, the base 5 of the trough being adapted to engage an end of the element and the coaxial inner and outer walls 6, 7 of the trough respectively engaging inner and outer peripheral portions of the element 1.

The inner peripheral portion of the base portion 5 of each support member 2, 3 is of increased thickness so as to form an integral annular gasket 8 which is raised above the level of the adjacent surface of the base of the trough portion, the opposite faces of the gasket 8 being adapted respectively to engage the end of the element adjacent the inner periphery thereof and a mount face against which that end of the filter element is to be sealed when the element is fitted within a filter housing.

In the second embodiment of the invention shown in FIGURE 2 the filter element 1 is mounted in a support member 11 which is, as in the first embodiment, formed as a unitary moulding of synthetic rubber or like plastic material in the form of an annular flat-bottomed trough 11, but in this case the inner and outer walls 12, 14 of the trough extend from one end to the other of the element, the free ends of the walls 12, 14 being secured to an annular end cap 15 at said other end by means of interengaged annular bead and groove formations 16, 18 and 17, 19 respectively on the wall ends and on the inner and outer peripheries of the end cap.

The end cap 15 and the base of the trough-shaped support member 11 are each formed with integral annular gaskets 8, as in the embodiment shown in FIGURE 1, adjacent the inner periphery of the support member and end cap.

The inner wall 12 and the outer wall 14 of the support member 11 are each formed with longitudinally extending slots, 20, 21 to permit the flow of liquid to or from the filter element 1 housed within the support member 11.

In the third embodiment of the invention shown in FIGURE 3 there are two support members 30, 31 of similar construction and each formed of a synthetic rubber or like plastic material in the form of an annular flat-bottomed trough. In this embodiment the inner annular wall 32 of each of the two support members 30, 31 is of greater length than the outer walls 33, the inner walls 32, being interengaged with each other by annular bead and groove formations 34, 35 at the ends of each of the inner walls 32.

The inner walls of the two support members are also formed with longitudinal slots 36 to permit the flow of liquid to or from the interior of the annular pleated filter element 1.

In this case also each of the support members 30, 31 is formed with an integral gasket 8 adjacent the inner peripheral portion of its base.

In the fourth embodiment of the invention shown in FIGURE 4 the filter element 1 is retained within a support member 40 formed as an annular trough the top of which is closed.

The support member 40 is made of plastic material and is formed with inner and outer parts which are interengaged. The outer part has an annular side wall 41 integral with an annular end wall 42, the latter, as in the other embodiments having an integral annular gasket 8. At its inner periphery the end wall 42 has a radially extending annular bead 43, and at its free end the side wall 41 has an axially extending annular bead 44. The inner part has a side wall 45 which is integral with an end wall 46, which has an integral annular gasket 8. The end wall has an annular recess 47 at its outer periphery; and the side wall 45 has at its free end an external annular groove 48, the beads and groove formations 44, 47 and 43, 48 being interengaged with each other to secure together the two parts of the support member 40.

The outer wall 41 is formed with longitudinal slots therein (not shown) as in the embodiment shown in FIGURE 2; and the inner wall 45 has longitudinal slots 49.

In any of the embodiments described above the support members may have a press fit on the respective filter elements. Alternatively, or additionally, the support members may be secured to the elements with an adhesive.

We claim:
1. A liquid filter unit comprising one end plate of synthetic plastic material formed as an annulus, inner and outer coaxial perforated walls secured to a second end plate, an annular filter element retained by engagement with said walls and extending from said one end plate to the said second end plate, a passage defined by said walls and traversed by said filter element, at least one of said end plates having a liquid discharge aperture as a continuation of said passage, and said one end plate being secured to said walls by an interengaged annular bead and groove formation formed at each of said walls.

2. A liquid filter unit as set forth in claim 1, said end plates and said coaxial walls each being of synthetic plastic material.

3. A liquid filter unit as set forth in claim 1, said annular bead and groove formations being at one end of said filter unit.

References Cited
UNITED STATES PATENTS

| | | | |
|---|---|---|---|
| 816,517 | 3/1906 | Whalen | 210—440 X |
| 2,592,104 | 4/1952 | Arakelian | 210—488 |
| 2,742,155 | 4/1956 | Sather | 210—457 X |
| 3,154,487 | 10/1964 | Thornton et al. | |
| 3,186,552 | 6/1965 | Cutler | 210—457 |
| 3,277,876 | 10/1966 | Abts | 55—498 X |
| 3,319,796 | 5/1967 | Royer et al. | 210—459 |
| 3,002,870 | 10/1961 | Belgarde et al. | 210—446 X |

FOREIGN PATENTS

| | | |
|---|---|---|
| 156,528 | 6/1953 | Australia. |

SAMIH N. ZAHARNA, *Primary Examiner.*

F. MEDLEY, *Assistant Examiner.*